United States Patent [19]

Patel

[11] Patent Number: 5,300,573
[45] Date of Patent: Apr. 5, 1994

[54] HIGH TEMPERATURE STABLE, LOW SOLVENT SWELLING THERMOPLASTIC ELASTOMER COMPOSITIONS

[75] Inventor: Raman Patel, Akron, Ohio

[73] Assignee: Advanced Elastomer Systems, L.P., St. Louis, Mo.

[21] Appl. No.: 6,551

[22] Filed: Jan. 21, 1993

Related U.S. Application Data

[60] Continuation-in-part of Ser. No. 662,157, Feb. 28, 1991, abandoned, which is a continuation-in-part of Ser. No. 382,372, Jul. 20, 1989, abandoned, which is a division of Ser. No. 179,814, Apr. 11, 1988, abandoned.

[51] Int. Cl.$^5$ .................. C08L 13/00; C08L 15/02; C08L 19/00; C08L 33/08
[52] U.S. Cl. .................. 525/109; 525/111; 525/117; 525/118; 525/119; 525/121; 525/122; 525/127; 525/129; 525/130; 525/131; 525/132; 525/148; 525/151; 525/176; 525/186
[58] Field of Search ............ 525/127, 130, 131, 129, 525/109, 111, 117, 118, 119, 121, 132, 148, 176, 151, 186, 122

[56] References Cited

U.S. PATENT DOCUMENTS

| | | | |
|---|---|---|---|
| 3,963,803 | 6/1976 | Tanaka et al. | 260/873 |
| 4,046,745 | 9/1977 | Selman | 525/123 |
| 4,096,202 | 6/1978 | Farnham | 523/201 |
| 4,104,210 | 8/1978 | Coran et al. | 260/4 |
| 4,130,535 | 12/1978 | Coran et al. | 260/33.6 |
| 4,141,863 | 2/1979 | Coran et al. | 260/3 |
| 4,202,950 | 5/1980 | Statton | 525/123 |
| 4,275,180 | 6/1981 | Clarke | 525/173 |
| 4,290,927 | 9/1981 | Tanaka et al. | 260/3 |
| 4,310,638 | 1/1982 | Coran et al. | 525/183 |
| 4,311,628 | 1/1982 | Abdou-Sabet et al. | 260/33.6 |
| 4,327,199 | 4/1982 | Coran et al. | 525/176 |
| 4,430,479 | 2/1984 | Merton | 525/127 |
| 4,473,683 | 9/1984 | Coran et al. | 525/78 |
| 4,555,546 | 11/1985 | Patel | 525/194 |
| 4,574,140 | 3/1986 | Sandstrom | 525/123 |
| 4,742,113 | 5/1988 | Gismondi | 525/123 |
| 4,981,908 | 1/1991 | Wolfe | 525/92 |

FOREIGN PATENT DOCUMENTS 0211649 2/1987 European Pat. Off.
1208585 10/1970 United Kingdom.

*Primary Examiner*—Patricia A. Short
*Attorney, Agent, or Firm*—William A. Skinner; Gordan B. Seward

[57] ABSTRACT

Thermoplastic elastomer compositions comprise a blend of polyester resin and a covalently-crosslinked acrylate rubber. Such compositions can be prepared by dynamic vulcanization of the rubber in admixture with the polyester and can exhibit high temperature dimensional stability and low oil swell.

15 Claims, No Drawings

HIGH TEMPERATURE STABLE, LOW SOLVENT SWELLING THERMOPLASTIC ELASTOMER COMPOSITIONS

CROSS-REFERENCE TO RELATED APPLICATIONS

This application is a continuation-in-part of copending application Ser. No. 07/662,157, filed Feb. 28, 1991 now abandoned which is a continuation-in-part of application Ser. No. 07/382,372, filed Jul. 20, 1989, now abandoned, which is a division of application Ser. No. 07/179,814, filed Apr. 11, 1988, now abandoned.

Disclosed herein are inventions of thermoplastic elastomer compositions which exhibit low solvent swelling at high temperatures. Particularly disclosed are inventions of thermoplastic elastomer compositions comprising polyester and crosslinked acrylic ester copolymer rubber.

BACKGROUND

Unless indicated otherwise all temperatures herein are in degrees Celsius. Thermoplastics are compositions which can be molded or otherwise shaped and reprocessed at temperatures above their melting or softening point. Thermoplastic elastomeric are materials which exhibit both thermoplastic and elastomeric properties, i.e. the materials can be processed as thermoplastics but have physical properties common to elastomers. Shaped articles may be formed from thermoplastic elastomers by extrusion, injection molding or compression molding without the time-consuming cure step required with conventional vulcanizates. Elimination of the time required to effect vulcanization provides significant manufacturing advantages. Further, thermoplastic elastomers can be reprocessed without the need for reclaiming and, in addition, many thermoplastic elastomers can be thermally welded.

Non-polar rubbers, e.g. polybutadiene, random, graft and block copolymers of styrene and butadiene, EPDM rubber, natural rubber, polyisoprene and the like, are readily mixable with non-polar thermoplastics such as polypropylene, polyethylene and polystyrene. Non-polar, highly unsaturated rubbers are generally not used at temperatures above about 125'; and non-polar thermoplastics have low melting points, e.g. about 120° for crystalline polyethylene, about 170° for crystalline polypropylene and about 105° for polystyrene. Thermoplastic elastomers based on non-polar, unsaturated rubbers and thermoplastics generally comprise stabilizers to achieve desired properties in high temperature applications. For instance, known thermoplastic elastomers, e.g. as disclosed in U.S. Pat. Nos. 4,104,210; 4,130,535 and 4,311,628, based on blends of diene or EPDM rubber and polyolefins are generally used at temperatures below about 120°.

Non-polar rubbers are generally used in applications free from extended exposure to solvent-like fluids such as automobile transmission fluid, motor oil, antifreeze, etc. to avoid swelling and the possible resulting reduction in performance properties. Resistance to such swelling, especially for application temperatures below about 125°, can be achieved by use of polar rubbers, e.g. nitrile rubber, chlorinated polyethylene rubber, neoprene, and the like. Because polar rubbers are not generally miscible with non-polar thermoplastic polymers such as polypropylene, it is commonly necessary to provide compatibilization. See, for instance, U.S. Pat. No. 4,555,546 which discloses blends of polyolefins, cured acrylic ester copolymer rubber and graft copolymer having polyolefin compatibilizing segments are rubber compatibilizing segments.

Alternatively, as disclosed in U.S. Pat. No. 4,141,863 polar rubbers can be blended with polar thermoplastics, e.g. polyamides, polyesters, polyarylates, polycarbonates, etc. Many of the more desired polar thermoplastic polymers melt at high temperature, for instance nylon 6 melts at about 225°. Since many preferred polar rubbers may tend to degrade when melt blended for extended periods with high melt temperature polar thermoplastics, resulting thermoplastic elastomer compositions may not have otpimal properties.

Fortunately, certain polar acrylate rubbers are exceptionally heat stable and can be useful in blends with thermoplastics. Such rubbers include acrylic ester copolymer rubbers, including ethylene/alkyl acrylate ester copolymer rubbers and functionalized, e.g. acid-modified, derivatives thereof. See, for instance, U.S. Pat. Nos. 4,310,638; 4,327,199; and 4,473,683 which disclose blends of polar thermoplastic polymers, i.e. polyamides, polyesters and styrenic polymers, respectively, with acid-containing acrylic ester copolymer rubber that is neutralized, i.e. ionically crosslinked with magnesium or zinc oxide. While such blends exhibit enhanced thermal stability, they are susceptible to solvent swelling, especially at higher temperatures where the ionic crosslink bonding becomes labile.

Also known in the art are compositions which contain major proportions of crosslinkable poly(ethylene terephthalate) and minor proportions of impact-modifying rubbers, which rubbers are selected for their insolubility in poly(ethylene terephthalate) so as to form (in the uncured state) a discrete dispersed phase therein. As these compositions are shown in British Patent 1,208,585, they also include "polyfunctional compounds" which are capable of reacting with poly(ethylene terephthalate) so as to crosslink it. These compositions are toughened plastics, rather than elastomers.

SUMMARY OF THE INVENTION

This invention provides thermoplastic elastomer compositions comprising blends of polyester resin and covalently-crosslinked acrylate rubber. Such blends contain a weight ratio of rubber to polyester of about 9:1 to about 4:6. Such thermoplastic elastomer compositions exhibit excellent high temperature dimensional stability and exceptional resistance to solvent swelling. In preferred embodiments such rubber is advantageously a functionalized olefin/acrylic ester copolymer rubber that is dynamically vulcanized, e.g. by a polyfunctional, covalently crosslinking agent. In preferred embodiments the polyester is advantageously a linear polyester such as a polyalkylene terephthalate, isophthalate or copolyester thereof, e.g., polyethylene terephthalate (PET) and polytetramethylene terephthalate (PBT). As used herein the term "elastomeric" refers to thermoplastic compositions which exhibit rubber-like elasticity, i.e., have a tension set of less than about 60 percent, preferably less than about 50 percent.

DESCRIPTION OF PREFERRED EMBODIMENTS

Polyester Resin

Suitable thermoplastic polyester resin comprises crystalline, high molecular weight (i.e. 10,000 wt. avg.

molecular weight or higher) solid non-segmented polymers having recurring

groups, including

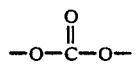

groups, within the polymer chain. The term "non-segmented" as used herein describes a polymer which is free of block copolyesters, i.e., it does not contain hard and soft blocky segments. Crystalline polyesters having a softening point or melting point between 160° and 280° are satisfactory. Although saturated polyesters (i.e., free of olefinic unsaturation) are preferred, unsaturated polyesters may be used provided that the rubber is crosslinked prior to blending with the polyester or provided that the rubber is dynamically crosslinked with a crosslinking agent that will not significantly induce crosslinking in the polyester. Significantly cross-crosslinked polyesters are unsatisfactory for the practice of this invention, resulting in compositions that are not thermoplastic. The term "crystalline" as used herein means that the polyester is at least partially crystallizable. For example, PET is crystallizable but may also exist as a substantially non-crystalline glassy polymer under many conditions. Many commercially available crystalline thermoplastic polyesters, including polycarbonates, may be advantageously employed in the practice of this invention. Alternatively such polyesters may be prepared by polymerization of one or more dicarboxylic acids, anhydrides or esters and one or more diols or by polymerization of one or more lactones. Exemplary satisfactory polyesters include poly(trans-1,4-cyclohexylene C2-6 alkane dicarboxylates) such as poly(trans-1,4-cyclohexylene succinate) and poly(trans-1,4-cyclohexylene adipate), poly(cis or trans-1,4-cyclohexane dimethylene CO-2 alkanedicarboxylates) such as poly(cis-1,4-cyclohexanedimethylene oxalate and poly(cis-1,4-cyclohexanedimethylenesuccinate), poly (C2-4 alkylene terephthalates) such as PET and PBT, poly(C2-4 alkylene isophthalates) such as polyethylene isophthalate and polytetramethylene isophthalate, poly (p-arylene C1-8 alkane dicarboxylates) such as poly(p-phenylene glutarate), poly (p-phenylene adipate), poly(p-xylene oxalate), poly (O-xylene oxalate), poly(p-phenylene di-C1-5 alkylene terephthalates) such as poly (p-phenylene dimethylene terephthalate) and poly(p-phenylene di-1,4-butylene terephthalate), polylactones such as poly(caprolactone) and others as disclosed in U.S. Pat. No. 4,141,863, incorporated herein by reference. Preferred polyesters employed in this invention are derived from phthalic acids, e.g., terephthalic acid or isophthalic acid; more preferred polyesters are poly(aklylene terephthalates), especially PET or PBT or mixed polyphthalates derived from two or more glycols, two or more phthalic acids, or a mixture thereof such as poly(alkylene tere-co-isophthalates).

Acrylate Rubber

Acrylate rubbers advantageously useful in the thermoplastic elastomer compositions of this invention comprise vulcanizable, i.e., crosslinkable, acrylate rubbers such as polyacrylate rubbers, acrylic ester copolymer rubbers and the like. These rubbers must be, in their uncured state, sufficiently polar so as to be technologically compatible with the polyester, i.e., capable of forming a co-continuous phase with the polyester. Suitable polyacrylate rubbers are described in Rubber World Blue Book, 1987 Edition, at pages 393-394, and can have functional groups, e.g. acid, hydroxy, epoxy, active halogen or other functional groups, as crosslinking sites; alternatively, acid group crosslinking sites can be generated in the rubber, e.g., by partial hydrolysis of ester groups. In many embodiments olefin/acrylic ester copolymer rubbers are preferred. Such rubbers can be copolymers produced by polymerizing at least one alpha olefin with at least one $C_1$-$C_{18}$ alkyl (meth)acrylate and, optionally, a minor amount of an unsaturated functionalized monomer which can provide crosslinking sites. Such functionalized monomer can comprise acid, hydroxy, epoxy, isocyanate, amine, oxazoline, diene or other reactive groups. In the absence of such functionalized monomer, crosslinking sites can be generated, e.g., by partial hydrolysis of ester groups of the rubber. Suitable alpha olefins for polymerization of such copolymer rubbers include ethylene, propylene, butene-1, isobutylene, pentenes, heptenes, octenes, and the like or mixtures thereof; $C_1$-$C_4$ alpha olefins are preferred and ethylene is often most preferred. Suitable alkyl (meth)acrylates for copolymerizing with the alkene include methyl acrylate, ethyl acrylate, t-butyl acrylate, n-butyl acrylate, 2-ethylhexylacrylate, methyl methacrylate, ethyl methacrylate, n-butyl methacrylate, and the like or a mixture thereof; $C_1$-$C_{12}$ alkyl (meth)acrylates are often preferred, and $C_1$-$C_4$ alkyl (meth)acrylates are most often preferred. In many cases a preferred olefin/acrylic ester copolymer rubber comprises unsaturated carboxylic acid monomer units, such as acid units, e.g., derived from (meth) acrylic acid or maleic acid, anhydride units, e.g., derived from maleic anhydride or partial ester units, e.g., derived from mono ethyl maleate. In many cases a preferred olefin/acrylic ester copolymer rubber is a terpolymer of ethylene, $C_1$-$C_4$ alkyl acrylate and an acidic monomer unit; more preferably such terpolymer comprises at least about 30 mole percent of ethylene, about 10 to 69.5 mole percent of methyl acrylate and about 0.5 to 10 mole percent mono ethyl maleate. In all cases it is preferred that the acrylate rubber be essentially non-crystalline and have a glass transition temperature ($T_g$) below room temperature, i.e., below about 23°.

CROSSLINKING AGENTS

Crosslinking agents employed in the thermoplastic elastomer compositions of this invention are polyfunctional, i.e., at least difunctional, compounds selected to cure the acrylate rubber, i.e., crosslink the rubber, by covalently bonding with the reactive functional groups of the rubber. When the rubber has carboxyl functional groups, e.g., derived from acrylic or maleic acid units, the covalent crosslinking agent is advantageously a compound with an hydroxy, amine, isocyanate, epoxy or other acid reactive functional group. Effective crosslinking agents include diols such as bisphenol-A, polyols such as pentaerythritol, amines such as methylene dianiline, diphenyl guanidine and the like, isocyanates such as toluene diisocyanate and isocyanate-terminated polyester prepolymer and epoxides such as diglycidyl ether of bisphenol-A. Generally, the amount of crosslinking agent does not exceed about 15 percent by weight of the acrylate rubber, depending on the molecular weight of the rubber and crosslinking agent. Preferred amounts of crosslinking agent are readily determined by routine experimentation to optimize desired properties of the thermoplastic elastomer compositions of this invention. The amount of crosslinking agent and the degree of crosslinking can be characterized in terms of the amount of rubber that is extractable from a thermoplastic elastomer composition. As used herein the term "extractable" refers to rubber that is extractable from a thermoplastic elastomer composition comprising a blend of a thermoplastic polyester resin and a covalently-crosslinked acrylate rubber. Rubber ca be extractable, e.g., because of a low level of crosslinking agent and/or because it comprises a non-crosslinkable fraction. Extractable rubber is conveniently determined by the weight loss from thin (about 0.2 mm) pressed films of thermoplastic elastomer compositions after immersion for 48 hours in a solvent (at 23°). Such solvent is selected as one in which the rubber is substantially soluble and in which the polyester is substantially insoluble. Such solvents can include dichloromethane, toluene, tetrahydrofuran and the like. Some preferred thermoplastic elastomer compositions will comprise sufficient crosslinking agent so that, after crosslinking, e.g., by dynamic vulcanization, no more than about 50 percent of the rubber is extractable. In other compositions, more desirable properties are achieved when not more than about 30 percent of the rubber is extractable. In still other compositions desirable properties are achieved when not more than about 20 percent of the rubber is extractable.

Plasticizer

In certain aspects of this invention thermoplastic elastomer compositions also comprise plasticizer which enhances the elastomeric properties of the composition. For example, without plasticizer compositions having a weight ratio of rubber to polyester about 4:6 have borderline properties of rubber-like elasticity; whereas, with plasticizer their elasticity can be increased. Moreover, in certain preferred aspects of this invention the incorporation of plasticizers can improve the composition's resistance to oil swelling, its heat stability, and reduced hysteresis, cost and permanent set. Generally, the quantity of plasticizer, when present, is between about 10 and 50 parts by weight of the composition. Suitable plasticizers include phthalate esters such as dicyclohexyl phthalate, dimethyl phthalate, dioctyl phthalate, butyl benzyl phthalate and benzyl phthalate; phosphates such as tributoxyethyl phosphate, tributyl phosphate, tricresyl phosphate, cresyl diphenyl phosphate, 2-ethtylhexyl diphenyl phosphate, isodecyl diphenyl phosphate and triphenyl phosphate; trimellitate esters such as C1-C9 alkyl trimellitate; sulfonamides such as N-cyclohexyl-p-toluenesulfonamide, N-ethylo,p-toluene-sulfonamide and o-toluenesulfonamide, epoxidized oils and liquid oligomeric plasticizers. Preferred plasticizers are liquids with low volatility to avoid emissions of plasticizer at the common melt temperatures of polyesters. The trimellitates and epoxidized oils are examples of commonly preferred plasticizers having low volatility.

Fillers

The properties of the thermoplastic elastomer compositions of this invention can be modified, by addition of fillers such as clay silica, talc, etc. which improve resistance to oil swelling. Such fillers are desirably incorporated into the rubber phase, especially when the polyester is highly crystalline, to avoid imparting undue rigidity t the composition. Other ingredients can include those commonly employed in the compounding of thermoplastics and rubbers such as carbon black, titanium dioxide, pigments, zinc oxide, stearic acid, accelerators, stabilizers, antidegrandants, processing aids, prevulcanization inhibitors, fire retardants, coupling agents and the like. Properties can be affected depending on when the filler is added, e.g., before or after vulcanization of the acrylate rubber. Carbon black, which can improve tensile strength, is desirably added prior to dynamic vulcanization, for instance in a masterbatch with the acrylate rubber. Stabilizers are often desirably added after dynamic vulcanization to provide lower oil swell. Desirable amounts and methods of addition of fillers, e.g., at up to about the parts by weight of rubber and polyester, and other ingredients can be readily ascertained through routine experimentation by one skilled in the art of compoundind aided by the illustrative teachings in the following examples.

Preparation of Thermoplastic Elastomer Compositions

Vulcanizable rubbers, although thermoplastic in the unvulcanized state, are often classified as thermosets because they can be cured to an unprocessable state. The improved thermoplastic elastomer compositions of this invention are processable as thermoplastics and are preferably prepared from blends of polyester resin and vulcanizable acrylate rubber which are treated under time and temperature conditions to crosslink the rubber. Simultaneously masticating and curing such blends advantageously provides the thermoplastic compositions of this invention and avoids the product of thermosets. Thus, the thermoplastic elastomer compositions of this invention are preferably prepared by blending a mixture of vulcanizable acrylate and a polyester resin at a temperature above the melting point of the polyester, adding crosslinking agent, then masticating the blend at a temperature sufficient to effect crosslink formation, using conventional masticating equipment, for example, a rubber mill, Brabender Mixer, Banbury Mixer, or a mixing extruder such as a twin-screw, continuous mixing extruder. The polyester resin and vulcanizable rubber are mixed at a temperature sufficient to soften the resin or, more commonly, at temperature above the melting point of the polyester resin. Since the rubber is technologically compatible with the polyester, they form co-continuous phases at this point. In many cases crosslinking agent is added after the molten polyester resin and vulcanizable rubber are intimately mixed. In other cases, e.g., where a late or delayed acting curative is employed, crosslinking agent can be added prior to intimate melt mixing of the polyester resin and the rubber. Heating and masticating at vulcanization temperatures are generally adequate to complete the crosslink formation in a few minutes or less; if shorter times are desired, higher temperatures may be used. Mastication is preferably continued for a short time after the composition reaches maximum consistency, e.g., as indicated by maximum torque exerted by the mixer. Typically, mixing times of about 0.5-30 minutes are satisfactory. When isocyanates, e.g., isocyanate-terminated polyester prepolymers, are used as crosslinking agents, mixing time can be substantially reduced by incorporation of a crosslinking accelerators such as magnesium stearate.

A suitable range of temperatures for crosslink formation is from about the melting point of the polyester resin to the decomposition temperature of the maximum temperature varying somewhat depending upon the antidegradants and the mixing time. Typically, the range is from about 150° to 350° with the maximum temperature varying somewhat depending upon the component polyester and rubber, the presence of antidegradants and the mixing time. Typically, the range is from about 150° to 300°. A preferred range is from about 180° to 280°. To obtain thermoplastic compositions, it is important that mixing continues without interruption until substantial crosslinking occurs. If appreciable crosslinking is allowed after mixing has stopped, a thermoset unprocessable composition may be obtained. A few simple experiments within the skill of practitioners in the art utilizing available polyester resins, vulcanizable acrylate rubbers and crosslinking agents will suffice to determine their applicability for the preparation of the improved products of this invention.

The characteristics of the thermoplastic elastomer compositions containing cured acrylate rubber depend upon the relative proportions of rubber and polyester and whether the compositions are statically or dynamically cured. Static curing can give thermoset compositions when the blend contains more than 40 parts of cured arcylate rubber per 100 parts by weight of rubber and polyester; whereas, dynamic curing of blends containing even up to 90 parts by weight of cured acrylate rubber per 100 parts of rubber and polyester generally provides thermoplastic compositions. When such high rubber compositions are partially crosslinked, the rubber and polyester can comprise co-continuous phases. Generally, compositions comprising about 40 parts or more of cured acrylate rubber per 100 parts of rubber and polyester are thermoplastic and elastomeric. Moreover, unplasticized compositions comprising less than about 40 parts of cured acrylate rubber per 100 parts rubber and polyester can be considered to be toughened plastics.

The effect of the relative proportions on blend composition characteristics cannot be defined with precision because the limits varying depending upon a number of factors, such as, the kind of polyester and acrylate rubber, the presence of fillers, plasticizers and other ingredients, and the extent the rubber is cured. Of course, it is understood that the properties of the compositions of the invention may be modified by the addition of ingredients which are conventional in the compounding of polyesters, acrylate rubbers, and blends thereof. For additional information concerning compounding and dynamic vulcanization, refer to U.S. Pat. Nos. 4,104,210; 4,130,535 and 4,141,863, all of which are incorporated herein by reference.

The term "blend" as used herein means a mixture ranging from small particles of crosslinked rubber well dispersed in a polyester matrix to con-continuous phases of polyester and a partially-crosslinked rubber. Compositions prepared by dynamic vulcanization comprising a blend of polyester, e.g. PBT, and cured acrylate rubber, e.g., acrylic ester copolymer rubber, in the form of small (50 microns or less) particles dispersed throughout the polyester are preferred. Especially preferred are such compositions comprising such rubber and polyester in the range of 20 to 50 parts of polyester per 100 parts of rubber and polyester, more preferably from 20 to 45 parts of polyester per 100 parts of rubber and polyester.

Thermoplastic elastomer compositions of this invention can be used to form a variety of molded, extruded, or calendered articles. The properties of such compositions depend upon the proportions of the components with a wide range of properties being available simply by varying such proportions.

The following disclosure is provided to illustrate specific embodiments and aspects of the thermoplastic elastomer composition of this invention but does not imply any limitation of the scope of the invention. The tensile properties of such compositions were determined in accordance with ASTM procedure D638. Unless otherwise indicated specimens were pulled in a tensile tester at 50.8 cm. (20 inches) per minute to failure. Ultimate tensile stress (UTS) is the tensile strength at break and is reported in units of megaPascals (MPa). Tensile modulus at 100 percent elongation (M100) and tensile modulus at 300 percent elongation (M300) are reported in MPa. Ultimate elongation (UE) is the elongation at break and is reported as a percent of the original specimen length. Hardness (H) is reported as a Shore A hardness (A) or a Shore D hardness (D). Tension set (TS) is the extension remaining after a specimen has been stretched and held for 10 minutes at twice its original length, then allowed to retract; TS is measured as the percentage increase of the original length after 10 minutes of retraction. Oil swell (OS) is determined in accordance with ASTM procedure D 471; OS is the measured increase in specimen mass after immersion in hot oil, expressed as a percentage of original mass. Unless otherwise indicated, e.g., by a temperature in parentheses or otherwise, specimens were immersed for 70 hours in ASTM Reference Oil No. 3 at 150°. Low temperature brittle point (LTB) is determined in accordance with ASTM procedure D 746: LTB is the temperature at which the specimen fractured by brittle failure upon impact, reported in degrees Celsius.

Materials used in the following examples include:

| Polyesters | |
|---|---|
| PE-1: | Gafite 1600A PBT from GAF; |
| PE-2: | Vituf 4302 mixed polyester of propane diol, butane diol and terephthalic acid and/or isophthalic acid from Goodyear, melting point: 208°; |
| PE-3: | Vitel 5126 mixed polyester from Goodyear, similar to Vituf 4302, except melting point is 174 C.; |
| PE-4: | Merlon M40F polycarbonate from Mobay; |
| PE-5: | Tenite 6P20A PBT from Eastman Kodak; |
| PE-6: | Cleartuf 1006 PET from Goodyear; and |
| PE-7: | Kodar PM6763 from Eastman Kodak. |
| Acrylate Rubbers: | |
| R-1: | VAMAC-G neat terpolymer of about 73 mole percent of ethylene, about 26 mole percent of methyl acrylate and about one mole percent of carboxylic acid from DuPont; |
| R-2: | VAMAC-123 masterbatch of 100 parts of VAMAC-G 20 parts of fumed silica and 3 parts of stabilizers and processing aids; and |
| R-3: | Hycar 4404 hydroxy functionalized acrylate rubber from BFGoodrich. |
| R-4: | Carboxylated acrylic rubber R90-130A from Zeon Chemicals (5% COOH). |
| R-5: | Epoxidized acrylic rubber AR-31 from Zeon Chemicals. |
| R-6: | Conventional acrylic rubber AR-71, |

-continued

| | |
|---|---|
| | having active chlorine cure sites, from Zeon Chemicals. |

Crosslinking agents:
| | |
|---|---|
| XL-1: | Mondur E-501 isocyanate-terminated polyester prepolymer from Mobay, about 19 percent NCO; |
| XL-2: | magnesium stearate |
| XL-3: | 4,4'-methylene dianiline; |
| XL-4: | Diphenyl quanidine; |
| XL-5: | Pentaerythritol; |
| XL-6: | Epon 828 di-glycidyl ether of bisphenol-A from Shell; |
| XL-7: | hexamethylenediamine carbonate; |
| XL-8: | N,N'-meta phenylenedimaleimide; |
| XL-9: | Hytemp NPC-50 quaternary ammonium compound from BFGoodrich; |
| XL-10: | potassium stearate; |

Stabilizers:
| | |
|---|---|
| S-1: | mixture of 0.4 pbw Ethanox 330 from Ethyl Corp., 0.3 pbw calcium stearate and 0.2 pbw disterylthiodipropionate; |
| S-2: | Naugard 445 amine antioxidant from Uniroyal; |
| S-3: | mixture of 1 pbw Irganox MD 1024 and 1 pbw Irganox 1098 antioxidants from Ciba-Geigy; |
| S-4: | S-1, where Ethanox 330 is replaced with Topanol CA from ICI; |
| S-5: | mixture of 0.3 pbw Ethanox 330, 0.06 pbw Irganox MD 1024, 0.06 pbw Ultranox 626 from GE Specialty Chemicals, 0.3 pbw-Mixxim BB/100 from Fairmount and 0.3 pbw Tinuvin 327 from Ciba-Geigy. |

Processing Aids:
| | |
|---|---|
| Mgs: | Magnesium Stearate |

Fillers:
| | |
|---|---|
| F-1: | Hysil 233 fumed silica from PPG Industries; |
| F-2: | Icecap K clay from Burgess Pigment Co.; |
| F-3: | Mistron Vapor talc from Cyprus Minerals Co.; |
| F-4: | Burgess KE clay from Burgess Pigment Co.; |
| F-5: | Cabosil TS-720 silica from Cabot Corp. |

Coupling Agents:
| | |
|---|---|
| C-1: | LICA-12 from Kenrich Petrochemicals |

Plasticiers:
| | |
|---|---|
| P-1: | Santicizer 79-TM alkyl trimellitate plasticizer from Monsanto Chemical Company; and |
| P-2: | Paraflex G-62 epoxidized soy bean oil from C.P. Hall Co. |

EXAMPLE 1

This example serves to illustrate thermoplastic elastomer compositions of this invention comprising polyester PE-1, acrylic ester copolymer rubber R-1 and varying amounts of isocyanate-terminated polyester prepolymer crosslinking agent XL-1. Controlling the degree of crosslinking, indicated by the amount of the composition, e.g., rubber, extractable in a solvent affords tailoring compositions to achieve a desired balance of properties.

Compositions according to this invention comprising isocyanate-terminated polyester prepolymer crosslinking agent were prepared by melt mixing the polyester PE-1 and rubber R-1 (containing 0.9 parts stabilizer S-1 per 100 parts rubber) at 100 rpm and 240° in a Brabender mixer; after 3 minutes the isocyanate crosslinking agent XL-1 and magnesium stearate were added to the blends which were dynamically vulcanized by continued mixing for an additional 3–4 minutes after maximum consistency was reached; the blend stocks were removed, cooled then returned to the Brabender for an additional 1–2 minutes of mixing; then the stocks were cooled and compression molded at 250°. Tensile properties of specimens are evaluated on a T-500 Tensometer at a speed of 20 inches (50.8 cm) per minute. The degree of crosslinking is determined from pressed films of each composition. Films, about 0.2 mm thick, were immersed in dichloromethane at about 23° for about 48 hours. The weight loss of the composition is divided by the weight of original rubber in the composition to determine extractable rubber (Extract). The analytical results indicate that compositions having not more than about 30 percent extractable rubber are sufficiently highly crosslinked to provide thermoplastic elastomer compositions of preferred properties.

TABLE 1

| | | | | | | | | | | |
|---|---|---|---|---|---|---|---|---|---|---|
| R-1 | 60 | 60 | 60 | 60 | 60 | 60 | 60 | 60 | 60 | 60 |
| PE-1 | 40 | 40 | 40 | 40 | 40 | 40 | 40 | 40 | 40 | 40 |
| XL-1 | 0 | 0.6 | 1.2 | 1.8 | 2.4 | 3.0 | 3.6 | 4.8 | 6.0 | 7.2 |
| S-4 | 0.54 | 0.54 | 0.54 | 0.54 | 0.54 | 0.54 | 0.54 | 0.54 | 0.54 | 0.54 |
| MgS | 0.3 | 0.3 | 0.3 | 0.3 | 0.3 | 0.3 | 0.3 | 0.3 | 0.3 | 0.3 |
| UTS | .2 | 2.6 | 5.2 | 12.1 | 14.1 | 20.6 | 21.4 | 21.5 | 22.2 | 23.5 |
| M100 | .7 | .8 | 2 | 8.2 | 9.7 | 10.5 | 11.9 | 11.0 | 11.5 | 11.2 |
| M300 | .1 | 1.2 | 5.3 | — | 14.1 | 18.1 | 19.6 | 20.3 | 20.8 | 22.2 |
| UE | 860 | 1300 | 460 | 280 | 300 | 390 | 350 | 330 | 320 | 340 |
| H | 54A | 40A | 56A | 78A | 87A | 34D | 37D | 40D | 40D | 42D |
| TS | Broke | 18 | 13 | 29 | 34 | 35 | 40 | 37 | 38 | 37 |
| OS | * | 90 | 90 | 74 | 60 | 44 | 40 | 36 | 35 | 35 |
| LTB | −34 | −54 | −60 | −60 | <−60 | <−60 | <−60 | <−60 | <−60 | <−60 |
| Extract | 99 | 70 | 43 | 27 | 23 | 16 | 14 | 13 | 10 | 4 |

*Disintegrated

EXAMPLE 2

This example serves to illustrate thermoplastic elastomer compositions of this invention over a range of rubber levels, e.g. with a rubber to polyester ratio from 9:1 to 4:6, having enhanced properties, e.g. UTS, UE, H, TS, OS, and/or LTB, as compared to prior art compositions comprising no crosslinking agent or ionomeric crosslinking agent such as magnesium oxide.

Prior art compositions without crosslinking agent were prepared by melt mixing polyester PE-1 and acrylic ester copolymer rubber R-1 containing 0.9 parts stabilizer S-1 per 100 parts rubber at 100 rpm and 240° for 10 minutes in a Brabender mixer; the blend stocks were removed, cooled then returned to the mixer and remixed for one additional minute; then the blend stocks were removed and compression molded at 250°. Prior art compositions comprising ionomeric crosslinking agents were prepared by melt mixing the polyester and rubber at 100 rpm and 240° in a Brabender mixer; after 2 minutes magnesium oxide XL-2 and magnesium stearate were added to the blends which were dynamically vulcanized by continued mixing for an additional 10 minutes or until 3 minutes after maximum consistency is reached; then the stocks were cooled, remixed for 1-2 minutes and then compression molded at 280°. Compositions according to this invention comprising isocyanate-terminated polyester prepolymer crosslinking agent were prepared by melt mixing the polyester and rubber at 100 rpm and 240° in a Brabender mixer; after 3 minutes the isocyanate crosslinking agent XL-1 and magnesium stearate were added to the blends which were dynamically vulcanized by continued mixing for an additional 3-4 minutes after maximum consistency was reached; the blend stocks were removed, cooled then returned to the Brabender for an additional 1-2 minutes of mixing; then the stocks were cooled and compression molded at 250°. Tensile properties of specimens are evaluated on a T-500 Tensometer at a speed of 20 inches (50.8 cm) per minute.

The data shows that tensile properties are improved by vulcanization. The data also shows that properties are enhanced by use of a covalently crosslinking agent as compared to an ionomeric crosslinking agent. For instance, lower hardness, often with higher elongation, can be provided in compositions having a rubber:polyester ratio of 9:1; lower hardness can be provided in compositions having a rubber:polyester ratio of 8:2; lower oil swell can be provided in compositions having a rubber:polyester ratio of 8:2 or less; and higher tensile properties can be provided in compositions having a rubber:polyester ratio of 6:4 or less.

TABLE 2A

| R-1 | 90 | 90 | 90 | 90 | 90 | 90 |
|---|---|---|---|---|---|---|
| PE-1 | 10 | 10 | 10 | 10 | 10 | 10 |
| XL-1 | 0 | 0 | 1.35 | 1.8 | 2.7 | 3.6 |
| XL-2 | 0 | 2.7 | 0 | 0 | 0 | 0 |
| MgS | 0 | 0.45 | 0.45 | 0.45 | 0.45 | 0.45 |
| S-1 | 0.81 | 0.81 | 0.81 | 0.81 | 0.81 | 0.81 |
| UTS | 0.3 | 13.6 | 5.9 | 7.4 | 6.3 | 4.1 |
| M100 | 0.3 | 2.3 | 0.6 | 0.6 | 1.0 | 1.7 |
| M300 | 0.3 | 7.9 | 0.6 | 0.8 | 3.2 | — |
| UE | 850 | 530 | 1400 | 1120 | 490 | 220 |
| H | 17A | 53A | 26A | 28A | 35A | 44A |
| TS | 40 | 2 | 16 | 13 | 7 | 6 |
| OS | — | 109 | 139 | 128 | 121 | 109 |
| LTB | — | <−60 | <−60 | <−60 | <−60 | <−60 |

TABLE 2B

| R-1 | 80 | 80 | 80 | 80 | 80 | 80 |
|---|---|---|---|---|---|---|
| PE-1 | 20 | 20 | 20 | 20 | 20 | 20 |
| XL-1 | 0 | 0 | 1.6 | 2.4 | 3.2 | 4.0 |
| XL-2 | 0 | 2.4 | 0 | 0 | 0 | 0 |
| MgS | 0 | 0.4 | 0.4 | 0.4 | 0.4 | 0.4 |
| S-1 | 0.72 | 0.72 | 0.72 | 0.72 | 0.72 | 0.72 |
| UTS | 0.3 | 14.2 | 7.5 | 9.0 | 7.9 | 8.6 |
| M100 | 0.3 | 4.7 | 0.8 | 1.7 | 2.7 | 5.7 |
| M300 | 0.3 | 11.4 | 2.3 | 5.4 | — | — |
| UE | 790 | 450 | 930 | 570 | 260 | 170 |
| H | 25A | 62A | 35A | 46A | 52A | 62A |
| TS | 42 | 5 | 9 | 8 | 5 | 7 |
| OS | — | 98 | 118 | 108 | 94 | 69 |
| LTB | — | <−60 | <−60 | <−60 | <−60 | <−60 |

TABLE 2C

| R-1 | 70 | 70 | 70 | 70 | 70 |
|---|---|---|---|---|---|
| PE-1 | 30 | 30 | 30 | 30 | 30 |
| XL-1 | 0 | 0 | 2.8 | 4.2 | 5.6 |
| XL-2 | 0 | 2.1 | 0 | 0 | 0 |
| MgS | 0 | 0.35 | 0.35 | 0.35 | 0.35 |
| S-1 | 0.63 | 0.63 | 0.63 | 0.63 | 0.63 |

TABLE 2C-continued

| UTS | 0.3 | 20.1 | 14.7 | 14.2 | 15.0 |
|---|---|---|---|---|---|
| M100 | 0.4 | 9.4 | 6.7 | 8.4 | 7.8 |
| M300 | 0.4 | 164 | — | — | — |
| UE | 650 | 510 | 270 | 230 | 270 |
| H | 45A | 80A | 75A | 85A | 84A |
| TS | 47 | 13 | 15 | 20 | 17 |
| OS | — | 60 | 66 | 53 | 48 |
| LTB | — | −60 | <−60 | <−60 | <−60 |

TABLE 2D

| R-1 | 60 | 60 | 60 | 60 | 60 |
|---|---|---|---|---|---|
| PE-1 | 40 | 40 | 40 | 40 | 40 |
| XL-1 | 0 | 0 | 3.6 | 4.8 | 6.0 |
| XL-2 | 0 | 1.8 | 0 | 0 | 0 |
| MgS | 0 | 0.3 | 0.3 | 0.3 | 0.3 |
| S-1 | 0.54 | 0.54 | 0.54 | 0.54 | 0.54 |
| UTS | 0.1 | 19.6 | 20.8 | 21.9 | 24.4 |
| M100 | 1.0 | 11.8 | 12.6 | 11.0 | 10.6 |
| M300 | 0.5 | 18.2 | — | 20.8 | 19.6 |
| UE | 570 | 430 | 260 | 320 | 370 |
| H | 63A | 36D | 40D | 40D | 41D |
| TS | — | 26 | 35 | 35 | 34 |
| OS | — | 45 | 37 | 35 | 34 |
| LTB | — | 54 | <−60 | <−60 | <−60 |

TABLE 2E

| R-1 | 50 | 50 | 50 | 50 | 50 | 50 |
|---|---|---|---|---|---|---|
| PE-1 | 50 | 50 | 50 | 50 | 50 | 50 |
| XL-1 | 0 | 0 | 0 | 0 | 4.0 | 5.0 |
| XL-2 | 0 | .5 | 1.5 | 4 | 0 | 0 |
| MgS | 0 | 0.25 | 0.25 | 0.25 | 0.25 | 0.25 |
| S-1 | 0.45 | 0.45 | 0.45 | 0.45 | 0.45 | 0.45 |
| UTS | 0.2 | 10.6 | 18.2 | 16.8 | 26.8 | 25.8 |
| M100 | 0.3 | 9.5 | 14.7 | 16.2 | 14.3 | 14.4 |
| M300 | — | — | 18 | — | 17.7 | 21.3 |
| UE | 130 | 200 | 390 | 130 | 390 | 380 |
| H | 79A | 39D | 44D | 48D | 46D | 51D |
| TS | — | 51 | 39 | 37 | 50 | 52 |
| OS | — | 39 | 31 | 37 | 50 | 23 |
| LTB | — | −50 | −44 | −40 | <−60 | <−60 |

TABLE 2F

| R-2 | 40 | 40 | 40 | 40 |
|---|---|---|---|---|
| P-1 | 60 | 60 | 60 | 60 |
| XL-1 | 0 | 0 | 3.2 | 4.0 |
| XL-2 | 0 | 1.2 | 0 | 0 |
| MgS | 0 | 0.2 | 0.2 | 0.2 |
| S-1 | 0.36 | 0.36 | 0.36 | 0.36 |
| UTS | 13.7 | 19.8 | 28.7 | 26 |
| M100 | — | 18.4 | 17.3 | 17.7 |
| M300 | — | 19.5 | 21.2 | 21.1 |
| UE | 12 | 310 | 420 | 410 |
| H | 47D | 54D | 58D | 56D |
| TS | — | 60 | 67 | 70 |
| OS | — | 22 | 18 | 16 |
| LTB | — | −40 | −60 | −60 |

EXAMPLE 3

This example serves to illustrate thermoplastic elastomer compositions based on a variety of polyesters, including the mixed polyesters PE-2 and PE-3 and polycarbonate PE-4. The polyesters were combined with acrylic ester copolymer rubber R-2 and various crosslinkers in the proportions specified in Table 3 essentially in the manner of Examples 1 and 2. The analytical results reported in Table 3 indicate that thermoplastic elastomer compositions according to this invention can be prepared from a variety of polyesters.

TABLE 3

| R-2 | 73.8 | 123 | 73.8 |
|---|---|---|---|

TABLE 3-continued

| | | | |
|---|---|---|---|
| PE-2 | 40 | 0 | 0 |
| PE-3 | 0 | 100 | 0 |
| PE-4 | 0 | 0 | 40 |
| XL-1 | 0 | 10 | 0 |
| XL-2 | 0 | 0 | 0 |
| XL-3 | .75 | 0 | .75 |
| XL-4 | 2.4 | 0 | 2.4 |
| MgS | 0 | .5 | 0 |
| S-2 | 0 | 0 | 0 |
| UTS | 7.45 | 23.1 | 11.9 |
| M100 | 6.07 | 9.1 | 2.7 |
| M300 | — | 19.2 | — |
| UE | 180 | 390 | 410 |
| H | 35D | 91A | 60A |
| TS | 15 | 22 | 15 |
| OS | — | 32[1] | — |
| LTB | — | <−60 | — |

[1] Oil-swell at 100°

EXAMPLE 4

This example serves to illustrate thermoplastic elastomer compositions dynamically vulcanized with covalently crosslinking agents exhibiting enhanced resistance to oil swell as compared to compositions dynamically vulcanized with ionically crosslinking agents. The compositions were prepared essentially in the manner of Examples 1 and 2. The analytical results reported in Table 4 indicate that covalently crosslinking agents can be used to provide thermoplastic elastomer compositions with higher tensile properties and higher resistance to oil swell.

TABLE 4

| | | | | | |
|---|---|---|---|---|---|
| R-2 | 73.8 | 73.8 | 73.8 | 73.8 | 73.8 |
| PE-5 | 40 | 40 | 40 | 40 | 40 |
| XL-1 | 0 | 0 | 0 | 0 | 0 |
| XL-2 | 1.8 | 0 | 0 | 0 | 0 |
| XL-3 | 0 | 0 | .6 | 1.2 | 0 |
| XL-5 | 0 | 0 | .6 | 0 | 0 |
| XL-6 | 0 | 0.9 | 0 | 0 | 0 |
| S-2 | .6 | .6 | .6 | .6 | .6 |
| UTS | 17.7 | 19.3 | 23.0 | 22.8 | 25.6 |
| M100 | 13.3 | 10.1 | 12.6 | 13.0 | 13.9 |
| M300 | 17.6 | — | — | — | — |
| UE | 320 | 270 | 260 | 260 | 290 |
| H | 40D | 36D | 38D | 39D | 41D |
| TS | 23 | 27 | 29 | 29 | 36 |
| OS (125°) | 24 | 23 | 20 | 19 | 17 |
| OS (150°) | 30 | 27 | 23 | 22 | 20 |

EXAMPLE 5

This example serves to illustrate thermoplastic elastomer compositions dynamically vulcanized with covalently crosslinking agents exhibiting enhanced properties at elevated molding temperatures as compared to compositions dynamically vulcanized with ionically crosslinking agents. The compositions were prepared with the components indicated in Table 5 essentially as the manner of Examples 1 and 2. The resulting thermoplastic elastomer compositions were molded into test specimens at mold temperatures of both 250° and 280°. The analytical results reported in Table 5 indicate that covalently crosslinking agents provide thermoplastic elastomer compositions which exhibit better retention of tensile properties, resistance to oil swell and low temperature brittle point than do compositions prepared from ionically crosslinking agents.

TABLE 5

| | | | | |
|---|---|---|---|---|
| R-2 | 61.5 | 61.5 | 61.5 | 61.5 |
| PE-1 | 50 | 50 | 50 | 50 |
| XL-1 | 0 | 0 | 5 | 5 |
| XL-2 | 1 | 1 | 0 | 0 |
| MgS | 0 | 0 | .25 | .25 |
| S-4 | .45 | .45 | .45 | .45 |
| $T_{mold}$ | 250 | 280 | 250 | 280 |
| UTS | 21.8 | 16.1 | 28.2 | 26.9 |
| M100 | 18.4 | 16.1 | 14.6 | 14.8 |
| UE | 260 | 100 | 320 | 290 |
| H | 49D | 48D | 49D | 49D |
| TS | 35 | 27 | 42 | 33 |
| OS (150°) | 27 | 28 | 19 | 19 |
| LTB | −54 | −40 | −60 | −60 |

EXAMPLE 6

This example serves to illustrate thermoplastic elastomer compositions comprising a variety of fillers. The compositions were prepared from the materials in the amounts indicated in Table 6 essentially in the manner of Examples 1 and 2. Molded specimens of each composition were aged in hot (150°) air for 168 hours. The analytical results reported in Table 6 indicate the effect of fillers on tensile properties, hardness, tension set, oil swell, low temperature brittle point and retention of properties after hot air aging.

TABLE 6

| | | | | | | |
|---|---|---|---|---|---|---|
| R-2 | 123 | 123 | 123 | 123 | 123 | 123 |
| PE-1 | 66.7 | 66.7 | 66.7 | 66.7 | 66.7 | 66.7 |
| XL-1 | 6 | 6 | 6 | 6 | 0 | 6 |
| XL-6 | 0 | 0 | 0 | 0 | 8 | 0 |
| S-3 | .6 | .6 | .6 | .6 | .6 | .6 |
| MgS | 1 | 1 | 1 | 1 | 1 | 1 |
| F-1 | 0 | 20 | 0 | 0 | 0 | 0 |
| F-2 | 0 | 0 | 20 | 0 | 0 | 0 |
| F-3 | 0 | 0 | 0 | 20 | 0 | 0 |
| F-4 | 0 | 0 | 0 | 0 | 20 | 0 |
| F-5 | 0 | 0 | 0 | 0 | 0 | 20 |
| As Molded: | | | | | | |
| UTS | 21.8 | 24.1 | 19.2 | 18.0 | 24.2 | 22.8 |
| M100 | 12.7 | 18.0 | 13.7 | 13.4 | 19.9 | 19.0 |
| UE | 240 | 180 | 210 | 170 | 140 | 150 |
| H | 39D | 40D | 36D | 37D | 48D | 40D |
| TS | 32 | 29 | 26 | 31 | 38 | 32 |
| OS (125°) | 23 | 22 | 23 | 22 | 10 | 10 |
| OS (150°) | 27 | 27 | 27 | 27 | 20 | 22 |
| LTB | −60 | −50 | −60 | −38 | −60 | −50 |
| Hot Air Aged: | | | | | | |
| UTS | 22.9 | 25.7 | 21.2 | 23.0 | 23.0 | 23.6 |
| M100 | 15.9 | 24.3 | 19.7 | 18.2 | 23.0 | 23.6 |

| | | | | | TABLE 6-continued | | | |
|---|---|---|---|---|---|---|---|---|
| UE | 200 | 120 | 140 | 110 | 100 | 100 | | |
| H | | 42D | 48D | 45D | 44D | 51D | 47D | |

EXAMPLE 7

This example serves to illustrate thermoplastic elastomer compositions of exceptional resistance to oil swell. Such compositions comprise silica filler and a high level of plasticizer. The compositions were prepared from the materials in the amounts indicated in Table 7. The compositions were prepared essentially in the manner of Examples 1 and 2, except that 100 parts of rubber R-1 was preblended with 20 parts of silica and 0.2 parts of coupling agent to provide a rubber masterbatch which was melt mixed with polyester PE-1 and plasticizer at 100 rpm and 240°. After crosslinking agent was added, mixing was continued until maximum consistency was observed, then stabilizer was added and mixing continued for about 4 Table 9 indicate that such hydroxy functionalized acrylate rubber can be used to provide thermoplastic elastomer compositions exhibiting exceptionally low oil swell.

1-2 minutes of mixing. The stocks were removed from the mixer, cooled and compression molded at 270° C.

The data set forth in Table 10 indicates that these compositions have exceptionally low oil swell at high temperature. The compositions also display good compression set properties.

TABLE 10

| PE-1 | 40 | 40 | 40 | 40 | 40 | 40 | 40 | 40 | 40 |
|---|---|---|---|---|---|---|---|---|---|
| R-4 | 60 | 60 | 0 | 0 | 0 | 0 | 0 | 0 | 0 |
| R-5 | 0 | 0 | 60 | 60 | 60 | 60 | 0 | 0 | 0 |
| R-6 | 0 | 0 | 0 | 0 | 0 | 0 | 60 | 60 | 60 |
| XL-7 | 0 | 0.6 | 0 | 0.6 | 0 | 0 | 0 | 0 | 0 |
| XL-1 | 0 | 0 | 0 | 0 | 0 | 6 | 0 | 6 | 0 |
| XL-8 | 0 | 0 | 0 | 0.6 | 0.6 | 0 | 0 | 0 | 0 |
| XL-9 | 0 | 0 | 0 | 0 | 0 | 0 | 0 | 0 | 1.8 |
| XL-10 | 0 | 0 | 0 | 0 | 0 | 0 | 0 | 0 | 1.2 |
| MgS | 0 | 0 | 0 | 0 | 0 | 0.6 | 0 | 0.6 | 0 |
| S-5 | 0 | 1 | 1 | 1 | 1 | 1 | 1 | 1 | 0 |
| UTS | 2.1 | 13.4 | 9.8 | 15.9 | 13.7 | 17.6 | 2.5 | 3.8 | 15.7 |
| M100 | 1.2 | 11.5 | | 11.6 | 11.9 | 12.7 | | 2.5 | 13.1 |
| UE | 1330 | 140 | 80 | 200 | 160 | 240 | 20 | 310 | 150 |
| H | 50A | 42D | 36D | 42D | 42D | 44D | 75A | 60A | 44D |
| TS | 33 | 44 | * | 50 | 52 | 49 | * | 30 | 40 |
| OS | 10 | 7 | 11 | 9 | 10 | 9 | 10 | 10 | 8 |

*Failed

TABLE 9

| R-3 | 60 | 60 |
|---|---|---|
| PE-1 | 40 | 40 |
| XL-1 | 0 | 3 |
| MgS | .54 | .54 |
| UTS | 2.4 | 15.3 |
| M100 | 2.4 | 12.3 |
| UE | 130 | 160 |
| H | 64A | 37D |
| TS | Failed | 43 |
| OS (125°) | 48 | 23 |
| OS (150°) | 55 | 25 |
| OS (175°) | 74 | 33 |
| LTB | −34 | −44 |

EXAMPLE 10

This example serves to illustrate compositions prepared from acrylate rubbers having carboxy, epoxy and active chlorine functionality. The compositions were prepared with the components indicated in Table 10 by melt mixing the polyester PE-1 and the rubber at 230° C. in a Brabender mixer for 3 minutes. The crosslinking agent was added and the blend was dynamically vulcanized by continued mixing for an additional 2 minutes after maximum consistency was reached; stabilizers were then added and the blend was mixed for an additional 2 minutes. The blend stocks were removed, cooled, then returned to the Brabender for an additional

What is claimed is:

1. A thermoplastic elastomer composition comprising a blend of
   (a) a thermoplastic non-segmented polyester resin having a melting point of from 160° to 280° C.,
   (b) a covalently-crosslinked acrylate rubber which in its uncured state is sufficiently polar so as to form a co-continuous phase with said polyester, and
   (c) a polyfunctional covalent crosslinking agent, wherein said polyester comprises 10 to 45 parts per hundred of polyester and rubber, said polyester is not significantly crosslinked, and wherein said rubber is crosslinked by dynamic vulcanization of the blend of (a), (b) and (c), and is in the form of small particles dispersed in a polyester matrix or in a co-continuous phase with the polyester.

2. A composition according to claim 1 wherein said polyester resin is selected from the group consisting of poly(trans-1,4-cyclohexylene $C_{2-6}$ alkane dicarboxylates), poly(cis or trans-1,4-cyclohexane dimethylene $C_{0-2}$ alkane dicarboxylates), poly($C_{2-4}$ alkylene terephthalates), poly($C_{2-4}$ alkylene isophthalates), poly(p-arylene $C_{1-8}$ alkane dicarboxylates), poly(p-phenylene di-$C_{1-5}$ alkylene terephthalates), polylactones and mixtures or non-segmented copolymers thereof.

3. A composition according to claim 1 wherein said polyester resin is selected from the group consisting of poly(ethylene terephthalate), poly(butylene terephthalate) and mixtures or non-segmented copolymers thereof.

4. A composition according to claim 1 wherein said rubber is a polyacrylate rubber with acid, hydroxy, epoxy or active halogen groups as crosslinking sites.

5. A composition according to claim 4 wherein said rubber comprises about 0.1-25 mole percent carboxylic acid.

6. A composition according to claim 1 wherein said rubber is a functionalized olefin/acrylic ester copolymer rubber.

7. A composition according to claim 6 wherein said rubber comprises a copolymer of ethylene, alkyl acrylate and unsaturated carboxylic acid.

8. A composition according to claim 1 wherein no more than about 50 percent of said rubber is extractable in dichloromethane at about 23° C.

9. A composition according to claim 1 wherein said crosslinking agent comprises an isocyanate-terminated polyester prepolymer.

10. A composition according to claim 1 wherein said copolymer rubber is covalently crosslinked by a polyamine, a polyisocyanate or a polyepoxide.

11. A composition according to claim 1 comprising from 20 to 45 parts of polyester per hundred parts of rubber and polyester.

12. A composition according to claim 11 wherein no more than about 30 percent of said rubber is extractable in dichloromethane at about 23° C.

13. A composition according to claim 1 further comprising particulate filler.

14. A composition according to claim 1 further comprising plasticizer at up to about 50 parts by weight of the composition.

15. A composition according to claim 1 further comprising particulate filler and plasticizer.

* * * * *